United States Patent [19]

Ciminero

[11] 4,000,556

[45] Jan. 4, 1977

[54] METHOD AND APPARATUS FOR PULLING TUBES

[76] Inventor: Anthony S. Ciminero, 115-½ Chenery St., San Francisco, Calif. 94131

[22] Filed: Nov. 17, 1975

[21] Appl. No.: 632,317

[52] U.S. Cl. .................................. 29/427; 29/252; 29/280; 29/282

[51] Int. Cl.² ........................................ B23P 19/02

[58] Field of Search ............ 29/427, 426, 252, 255, 29/280, 282, 244, 200 D, 200 H, 243.52, 202 R, 202 D, 234, 263, 264, 265; 72/391

[56] References Cited

UNITED STATES PATENTS

| | | | |
|---|---|---|---|
| 1,964,023 | 6/1934 | Armstrong | 29/252 |
| 2,697,872 | 12/1954 | Armstrong | 29/252 |
| 2,947,074 | 8/1960 | Newman | 29/280 |
| 2,950,525 | 8/1960 | Duncan et al. | 29/252 |
| 3,507,028 | 4/1970 | Stellatella | 29/252 X |
| 3,791,011 | 2/1974 | Keys | 29/252 |
| 3,835,520 | 9/1974 | Sismore | 29/202 D |

Primary Examiner—James R. Duzan
Attorney, Agent, or Firm—Flehr, Hohbach, Test, Albritton & Herbert

[57] ABSTRACT

Apparatus for hydraulically extracting tubes from the tube sheets in condensers, heat exchangers and the like. The apparatus engages the interior wall of the tube being extracted with two complementary grabbing members. By relative translational motion, these grabbing members engage the entire circumference of the interior wall of the tube. The grabbing members are attached to a floating yoke that provides mechanical compensation for any misalignment between the grabbing members and the axis of the tube being pulled. The yoke also permits the grabbing members to be translationally adjusted by rotation with respect to the tube pulling apparatus. The yoke and the grabbing members are operatively connected to a friction carrier that limits the amount of relative translational motion between the members and thereby limits the lateral force exerted on the tube wall. The grabbing members, the yoke, and the friction carrier are connected to the operating shaft of a hydraulic cylinder that powers the apparatus.

9 Claims, 7 Drawing Figures

METHOD AND APPARATUS FOR PULLING TUBES

BACKGROUND OF THE INVENTION

1. Field of the Invention

This invention generally relates to hydraulically powered tube extractors for heat exchangers and, more particularly, to improvements in such extractors.

2. Description of the Prior Art

In condensers, boilers, and heat exchangers where two fluids are brought into thermal communication, it is customary to pass one fluid through a plurality of tubes and to pass the other fluid around the exterior of the tubes. The fluid passing around the exterior of the tubes is contained in the shell of the heat exchanger. In most constructions, the tubes are spaced apart and separated from the fluid in the shell by two end plates commonly known as tube sheets. Each tube sheet contains a plurality of holes into which the tubes are inserted. The tubes extend between the tube sheets so that a fluid-tight barrier is formed between the two fluids. To anchor each tube in its respective hole in the tube sheet, the end of the tube is expanded and flared.

It is customary to replace heat exchange tubes after they have become corroded and pitted and when they commence leaking fluid across the barrier. In replacing tubes, the old tubes are hydraulically extracted from the tube sheet and are replaced by new tubes. The function of the present invention is to hydraulically extract these old tubes from the tube sheet.

The present invention relates to the same subject matter as U.S. Pat. No. 2,950,525, entitled "Tube Puller", issued on Aug. 30, 1960, to Mr. Edward J. Duncan and Mr. Anthony S. Ciminero.

SUMMARY OF THE INVENTION AND OBJECTS

The present invention is directed to a method and apparatus for hydraulically extracting tubes from the tube sheets located in condensers, heat exchangers and the like. With two complementary grabbing members, the apparatus engages the interior side wall of the tube being extracted. One grabbing member is translationally movable along the inclined surface of the other member so that relative lateral motion is produced. This lateral motion causes the two grabbing members to engage substantially the entire circumference of the inner side wall of the tube. In addition, one of the grabbing members is connected to a floating yoke that provides mechanical compensation for any misalignment between the grabbing members and the side wall of the tube being pulled. The floating yoke also includes an adapter that permits relative translational adjustment of the grabbing members through axial rotation with respect to the tube pulling apparatus. The yoke and the tube grabbing members are operatively connected to the operating shaft of an hydraulic cylinder. The motion of the operating shaft causes the grabbing members to engage the interior side wall of the tube and to extract the tube from the tube sheet.

It is an object of the present invention to provide mechanical compensation in a tube pulling apparatus for any misalignment between the tube grabbing members and the side wall of the tube being pulled.

A further object of the present invention is to pull tubes of small diameter wherein the surface area available for grabbing is limited.

An additional object of the present invention is to permit lateral adjustment of the grabbing members by providing relative axial rotation of the members with respect to the tube pulling apparatus.

A further object of the present invention is to maximize the surface area of the grabbing members available for grabbing the tubes.

Additional objects and features of the invention will appear from the following description in which the preferred embodiment has been set forth in detail in conjunction with the accompanying drawings.

DETAILED DESCRIPTION OF THE PREFERRED EMBODIMENT

Figures 1, 2:
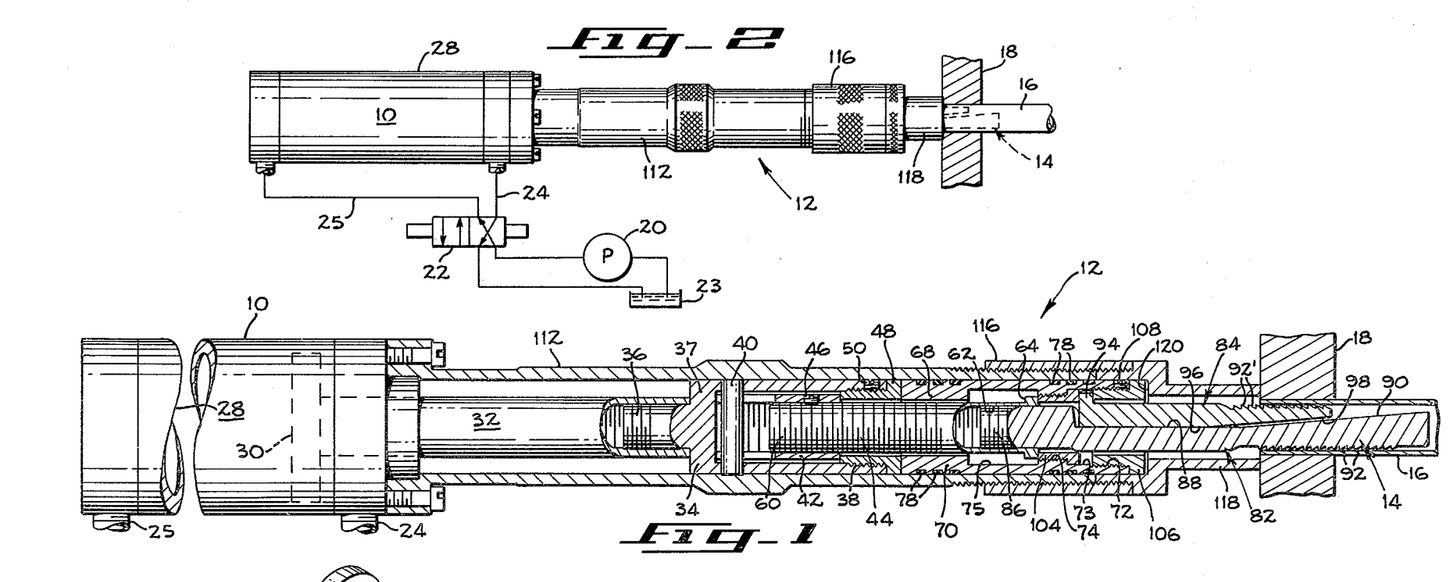
FIG. 1 is a side elevational view, partially cut away and partially in section, of the tube pulling apparatus of the present invention.
FIG. 2 is a diagrammatic side elevational view, partially cut away, of the tube pulling apparatus of FIG. 1.

FIGS. 1 and 2 illustrate the preferred embodiment of the tube pulling apparatus according to the present invention. The tube pulling apparatus includes an hydraulic cylinder 10 operatively connected to a tube pulling assembly 12. The tube pulling assembly provides adjustment and motion to two complimentary grabbing members 14. The grabbing members engage the interior side wall of a tube 16 which is located in a tube sheet 18. The tube pulling apparatus operates by applying a mechanical force between the tube and tube sheet.

The tube pulling apparatus, FIG. 2, is powered by a conventional hydraulic pump 20 that supplies hydraulic fluid under pressure to an hydraulic actuator 22. Hydraulic fluid is provided by an hydraulic sump 23. The hydraulic actuator is a solenoid-operated flow control valve that directs hydraulic fluid under pressure into either hydraulic line 24 or hydraulic line 25. The actuator also provides a return path to the sump for the fluid in the hydraulic line not being pressurized by the hydraulic pump.

The hydraulic lines 24, 25, FIGS. 1 and 2, are connected to the hydraulic cylinder 10. The hydraulic cylinder is of conventional construction and includes a housing 28 that encloses a piston 30 connected to an operating shaft 32. When the hydraulic actuator 22 supplies hydraulic fluid through hydraulic line 24 to the shaft side of the piston 30, the operating shaft 32 retracts into the cylinder. When the hydraulic actuator directs fluid through hydraulic line 25 to the piston side of the piston 30, the operating shaft 32 is extended from the cylinder. In one embodiment of the present invention actually constructed, the hydraulic cylinder had a two inch diameter piston with a four inch stroke and was rated at 2,000 psi. The hydraulic cylinder was normally operated at 800 psi.

Threadably received in the free end of the operating shaft 32, FIG. 1, is a chamber housing 34. The chamber housing includes a threaded stud portion 36, a medial plate portion 37, and an internally threaded cylindrical portion 38. The chamber housing has the shape of a hollow, right circular cylinder with a stud protruding from the center of the bottom. The stud portion is screwed into the operating shaft 32 of the hydraulic cylinder 10 and is rigidly retained therein. The chamber housing also includes a housing pin 40 that is positioned within the cylindrical portion of the chamber housing near the medial plate portion. The housing pin is rigidly attached to the chamber housing and passes through two walls of the cylindrical portion along a diameter of the cylinder.

Received within the cylindrical portion 38, FIG. 1, of the chamber housing 34 is a floating yoke 42. The floating yoke has the shape of a hollow, right circular cylinder with an internally threaded hole in its base. The base is oriented toward the grabbing members 14. The yoke also has a deep channel cut along a diameter of the cylinder across the open end of the yoke proximate to the hydraulic cylinder 10. This deep channel receives the chamber housing pin 40 hereinbefore described. The chamber housing pin prevents the yoke from rotating when the grabbing members 14 are translationally adjusted as hereinafter described. The diameter of the yoke is dimensioned to be substantially smaller than the inner side wall of the cylinder portion 38 of the chamber housing. This dimensioning permits lateral motion of the yoke with respect to the chamber housing. The lateral motion or floating provides mechanical compensation for any misalignment between the axis of the grabbing members 14 and the axis of the tube 16. As hereinafter described, the smaller diameter of the yoke permits one of the grabbing members to move laterally with respect to the other member and thereby engage the side wall of the tube. The floating yoke further includes a tapped hole in the base portion of the cylinder into which is received the threaded end of the adapter 44. The adapter is rigidly retained within the yoke by a set screw 46. The set screw anchors the yoke to the adapter and during operation prevents any relative motion therebetween. The yoke and the adapter are retained within the chamber housing 34 by a chamber housing cap nut 48 which is threaded into the end of the cylindrical portion 38 of the chamber housing. The chamber housing cap nut is anchored in place by a set screw 50.

It should be appreciated from the foregoing that the adapter 44, FIG. 1, and the floating yoke 42 are rigidly attached together and are prevented from axial rotation about the longitudinal axis of the tube pulling apparatus by the housing pin 40. Further, the adapter and the floating yoke are retained within the chamber housing 34 and move therewith by the chamber housing cap nut 48. In addition, the floating yoke and the adapter are dimensioned to permit lateral movement with respect to the longitudinal axis of the tube pulling apparatus. In other words, a displaceable coupling link is formed.

The adapter 44, FIG. 1, provides both lateral adjustment of the grabbing members 14 and also connects the grabbing members to the operating shaft 32 of the hydraulic cylinder. The adapter 44 includes a threaded interconnecting portion 60 that engages the floating yoke 42 hereinbefore described. The interconnecting portion and the floating yoke are rigidly retained together by the set screw 46. The adapter further includes an internally threaded opening 62 whereat the grabbing members are adjusted. In addition, at the end of the adapter remote from the floating yoke and proximate to the internally threaded opening 62 is an integral stop flange 64. During the operation when the operating shaft 32 is being retracted, the stop flange engages the bottom 68 of the friction carrier 70 hereinafter described and during this operation when the operating shaft is being extended, the stop flange engages the inner cap screw 104. The stop flange, the cap screw and the bottom of the carrier form a lost motion assembly between the grabbing members and the operating shaft. This lost motion assembly permits the tube grabbing members to move in a longitudinal direction with respect to each other and thereby engage and disengage the tube.

The adapter 44, FIG. 1, is slidably received within a circular opening located in the bottom portion 68 of the friction carrier 70. The friction carrier is generally cylindrical in shape and includes an internally threaded opening 72 located at the end of the carrier nearest the grabbing members 14. Next to the threaded opening on the friction carrier going in a direction toward the hydraulic cylinder 10 is, in turn, an unthreaded inner side wall surface 73, an intrusive threaded collar 74, and a second unthreaded interior side wall surface 75. The functions of these elements are hereinafter described. The friction carrier further includes a plurality of 0-rings 78 located in the exterior side wall thereof. During retraction of the hydraulic operating shaft 32, the 0-rings insure that the grabbing members 14 move relative to each other in a longitudinal direction as hereinafter described.

Figure 3:
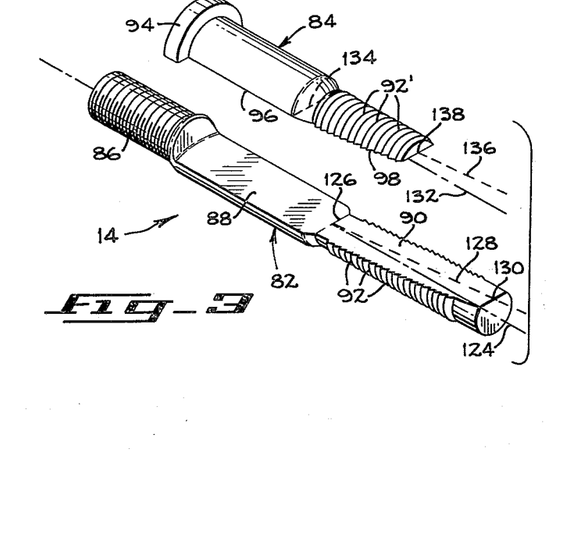
FIG. 3 is an orthogonal view of the tube grabbing members of the apparatus of FIG. 1.

The two grabbing members 14, FIGS. 1 and 3, include an expansion tap 82 and an expansion finger 84. The expansion tap 82 comprises an externally threaded end portion 86 that is received into the internally threaded opening 62 of the adapter 44. The expansion tap further includes a flat planar portion 88 centrally located on the member. The planar portion is coextensive with the central longitudinal axis of the expansion tap and the cross-section of the tap at this location is semi-circular. The flat planar portion 88 terminates into an upward opening (FIG. 1), inclined planar portion 90. The planar portion forms a wedge, the free end of which has a larger lateral dimension measured normal to the plane than the comparable lateral dimension measured at the end near the flat, planar portion. In one preferred embodiment, the inclined portion has a slope of 5° measured from the longitudinal axis of the expansion tap. Of course, other angles will provide workable devices. For example, variations of plus or minus ten percent or more from five degrees are believed acceptable. The angle of inclination or slope is chosen as a compromise between having grabbing members that are excessively short with minimal tube contact area and grabbing members that are excessively long with minimal lateral relative motion therebetween. The exterior circular side wall of the expansion tap is notched with a plurality of inclined teeth 92.

The teeth are angled to engage the inner sidewall of the tube 16 when being withdrawn therefrom.

The expansion finger 84, FIGS. 1 and 3 is dimensioned to complement the expansion tap 82. The expansion finger 84 includes at one end a semi-circular shoulder 94 which is engaged by the friction carrier 70. This shoulder is positioned in the annular space formed by the sidewall surface 73 of the friction carrier. The expansion finger also includes a flat planar portion 96 that is semi-circular in cross section. The flat planar portion terminates into an upward opening (FIG. 1), inclined planar portion 98. This inclined planar portion is complementary to the inclined planar portion 90 of the expansion tap. The inclined planar portion 98 forms a wedge the free end of which has a smaller lateral dimension measured normal to the plane than the comparable lateral dimension measured at the end near the flat planar portion. The angle of inclination of this portion is also five degrees measured with respect to the longitudinal axis of the apparatus. In addition, the expansion finger has an exterior circular sidewall notched with a plurality of teeth 92' for engaging the inner sidewall of the tube 16.

Figure 4:
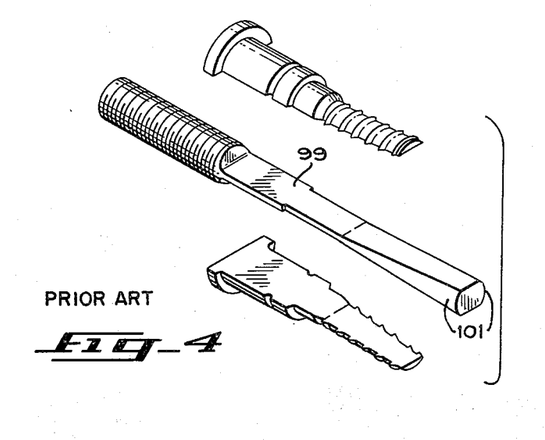
FIG. 4 is an orthogonal view of the tube grabbing members disclosed in U.S. Pat. No. 2,950,525, hereinbefore described.

It should be appreciated that the expansion tap 82 and expansion finger 84 are complementary units, and when the flat planar portions 88, 96 of each positioned together, the combined cross section is circular. It should further be appreciated that the teeth 92, 92' are located around the entire circumference of the two members and the positioning of the teeth provides a substantially uninterrupted, contiguous cylindrical contact surface for engaging the interior cylindrical sidewall of the tube 16. This contrasts with the grabbing members illustrated in FIG. 4. The central member 99 of the assembly has two sidewall surfaces 101 that are unnotched.

Within the friction carrier 70, FIG. 1 the stop flange 64 of the adapter 44 is free to move in the cylindrical chamber formed between the bottom wall 68 of the friction carrier, the smooth sidewall 75 of the carrier and intrusive threaded collar 74. The adapter is retained within this volume by the inner cap screw 104 which threadably engages the intrusive collar. The aforedescribed components form a lost motion assembly between the operating shaft 32 and the grabbing members 14. The threaded end portion 86 of the expansion tap 82 passes through a central opening located in the end of the inner cap screw. The longitudinal motion of the expansion tap is not restricted by the opening in the inner cap screw but the stop flange 64 is prevented from moving outside of the aforedescribed cylindrical chamber by the presence of the cap screw.

The shoulder 94 of the expansion finger 84, FIGS. 1 and 3 is retained in the friction carrier 70 between the inner cap screw 104 and a friction carrier cap screw 106. The friction carrier cap screw is treadably engaged by the internally threaded opening 72 of the friction carrier and is rigidly retained therein by a set screw 108. The shoulder 94 is free to rotate axially within the annular space formed between the inner cap screw 104, the friction carrier cap screw 106 and the smooth sidewall surface 73 of the friction carrier.

The chamber housing 34, FIG. 1 and the friction carrier 70 are maintained in coaxial alignment during operation by a cylindrical main housing 112. This main housing is rigidly bolted to the housing 28 of the hydraulic cylinder 10. The main housing also supports the hydraulic cylinder with respect to the tube sheet 18 so that the operating shaft 32 and the tube grabbing members 14 can move in a longitudinal direction and withdraw the tube.

The interior circular sidewall of the main housing 112, FIG. 1 is frictionally engaged by a plurality of 0-rings 78 retained in channels cut into the sidewall of the friction carrier 70. The 0-rings restrain the motion of friction carrier as hereinafter described. The exterior sidewall of the main housing at the end remote from the hydraulic cylinder is threaded to receive a nose sleeve 116. The nose sleeve is cylindrical in in shape and contains interior threads throughout. The nose sleeve also receives a nose anvil 118. The forward end of the nose anvil contacts the wall of the tube sheet 18 during tube withdrawal. The purpose of the nose sleeve 118 is to adjust the position of the friction carrier cap screw 106 with respect to the nose anvil 118 so that when the operating shaft 32 is fully extended the friction carrier cap screw does not contact the interior collar 120 of the nose anvil. The extension of the grabbing members 14 is thus halted by the hydraulic cylinder 10 and not by the tube pulling apparatus.

In one embodiment of the present invention actually constructed the main housing 112 was fabricated from soft carbon steel tubing. The grabbing members 14 were fabricated from tool steel hardened to Rockwell forty seven. All of the components besides the main housing and the grabbing members were fabricated from chrome molybdenum steel. In addition, the chamber cap nut 48, the inner cap screw 104, the friction carrier cap screw 106 and the nose anvil 118 were case hardened.

Figure 5:
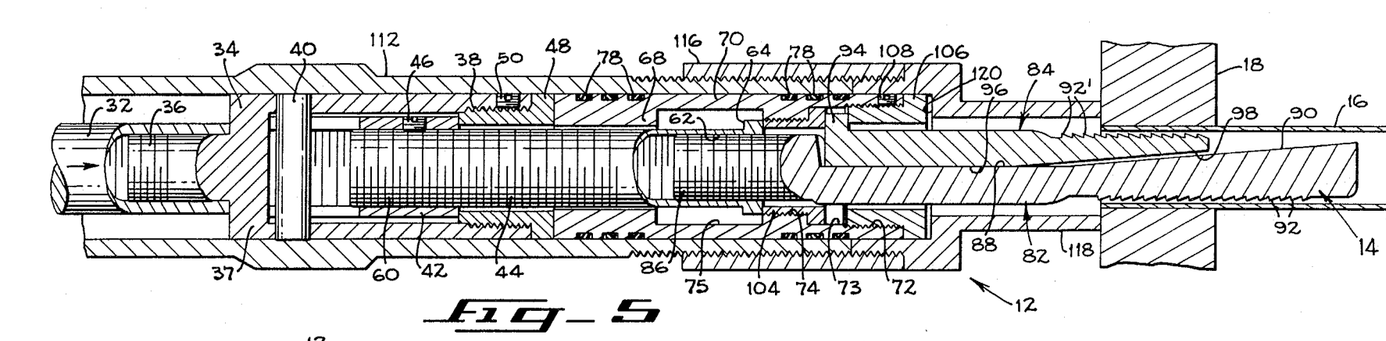
FIG. 5 is a side elevational view, partially cut away and partially in section, of the tube pulling apparatus of FIG. 1 wherein the apparatus is illustrated at the point just after insertion of the grabbing members into the tube being pulled.
Figure 6:
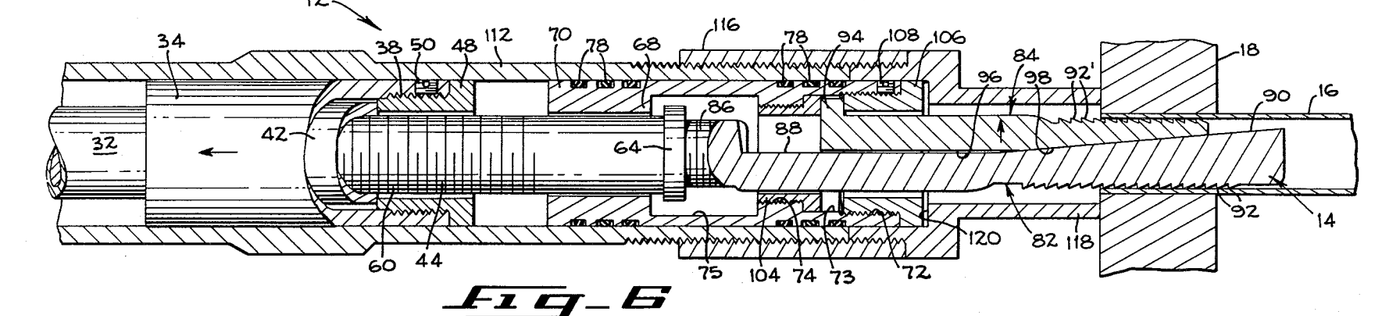
FIG. 6 is a side elevational view, partially in section and partially cut away, of the tube pulling apparatus of FIG. 1 wherein the apparatus is illustrated at the point when the tube wall is being engaged by the grabbing members but is not being withdrawn.
Figure 7:
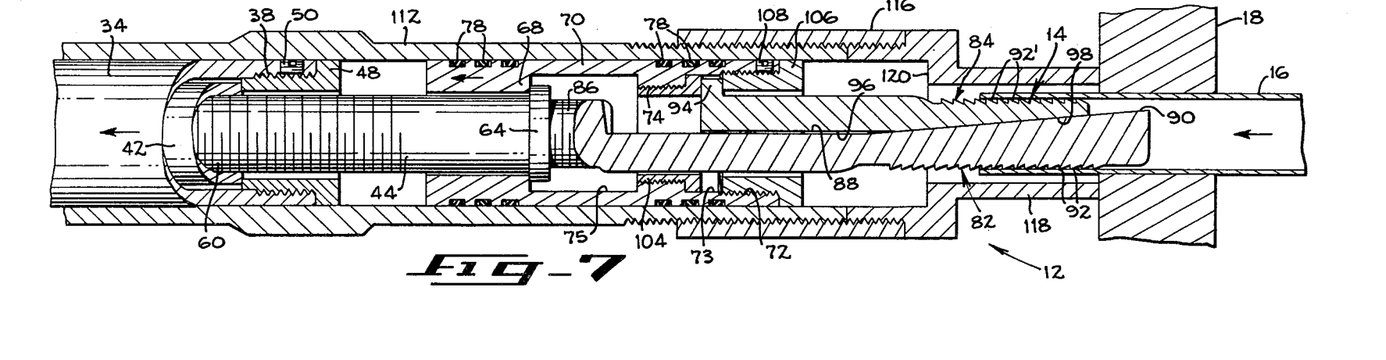
FIG. 7 is a side elevational view, partially cut away and partially in section, of the tube pulling apparatus of FIG. 1 wherein the apparatus is illustrated at the point when the grabbing members are withdrawing the tube from the tube sheet.

The operation of the tube pulling apparatus is illustrated in FIGS. 5-7. The apparatus is initially positioned (FIG. 5) with the operating shaft 32 fully extended and with both the chamber housing 34 and the friction carrier 70 pushed toward the nose anvil 118. It should be noted that in this position the stop flange 64 of the adapter 44 is located proximate to the inner cap screw 104.

To accomodate the tubes of differing size, the grabbing members 14 are adjustable to provide lateral dimensional variation. The members mate together to form two complementary wedges that can be either increased or decreased in dimension by relative translational motion with respect to each other. To obtain this change in dimension the two grabbing members are rotatable about the longitudinal axis of the apparatus. In particular, the expansion finger 84 is retained between the inner cap screw 104 and the friction carrier cap screw 106. These two caps screws permit the expansion finger to rotate but prohibit its longitudinal motion with respect to the friction carrier. The expansion tap 82 is threadably received within the adapter 44 and is permitted to relatively rotate therein. The adapter 44 is prevented from rotating and inadvertant disassembly by the attached yoke 42 which engages the housing pin 40. The housing pin, the chamber housing 34, and the operating shaft 32 form a rigid, non-rotatable assembly.

When the grabbing members 14, FIG. 15 are rotated together, the expansion tap 82 is either threaded into or out of the adapter 44. This axial rotation causes longitudinal translation of the expansion tap. The shoulder 94 of the expansion finger 84 rotates in the annular space between the friction carrier cap screw 106 and the inner cap screw 104. These two cap screws prohibit, however, any longitudinal motion of the expansion finger with respect to the friction carrier. The motion of the expansion tap 82 into or out of the adapter 44 creates relative motion between the two wedge-shaped grabbing members and their combined circular cross section correspondingly changes in diameter. It should be appreciated that when the expansion tap 82 is rotated in a direction of withdrawal from the adapter 44, the combined circular cross section of the grabbing members decreases.

To commence tube pulling, the apparatus is first inserted into the tube 16 with its operating shaft 32 fully extended as illustrated in FIG. 5. The grabbing members 14 are inserted into the tube 16 until the nose anvil 118 contacts the exterior surface of the tube sheet 18.

Next, the hydraulic actuator 22, FIG. 2 is positioned to direct hydraulic fluid from the hydraulic pump 20 into the hydraulic line 24 and the shaft side of the piston 30. This positioning of the hydraulic actuator causes the operating shaft 32 to commence retracting into the hydraulic cylinder 10. Referring to FIG. 6, the retraction of the operating shaft causes the attached chamber housing 34 and the chamber housing cap nut 48 to pull the yoke 42 and the adapter 44 away from the tube sheet 18. The adapter 44 slides without mechanical restraint through the opening in the bottom 68 of the friction carrier 70. The motion of the adapter 44 thereby withdraws the expansion tap 82 from the tube.

In contrast to this motion, the friction carrier 70, FIG. 6 and the expansion finger 84 are not initially retracted by the operating shaft 32. The 0-rings 78 located in the exterior sidewall of the friction carrier frictionally engage the inner cylindrical sidewall of the main housing 112. These 0-rings retard the motion of the friction carrier and permit the expansion tap 82 to move longitudinally with respect to the expansion finger 84. The expansion finger 84 is retained between the inner cap screw 104 and the friction carrier cap screw 106 so that longitudinal motion between the expansion finger 84 and the friction carrier is prevented. The relative motion between the expansion tap 82 and the expansion finger 84 causes their combined circular cross section to increase and to thereby engage the interior side wall of the tube. This relative motion is continued until the teeth 92 have dug into tube wall sufficiently to permit the extraction of the tube from the tube sheet.

The adapter 44, FIG. 6 and the expansion tap 82 move longitudinally with respect to both the expansion finger 84 and the friction carrier 70 until the stop flange 64 reaches the bottom portion 68 of the friction carrier. When the stop flange engages the bottom portion 68 of the friction carrier, relative motion between the grabbing members stops and the circular cross section of the members reaches its maximum area. This relationship is illustrated in FIG. 7. After this point the hydraulic operating shaft 32 simultaneously pulls both the friction carrier and the two grabbing members 14. The operating shaft overcomes the frictional restraint of the 0-rings 78 heretofore maintaining the friction carrier stationary with respect to the main housing 112.

It should be appreciated that the grabbing members 14 are adjusted so that they engage the inner sidewall of the tube 16 with sufficient lateral force to securely imbed the teeth 92, 92'. However, this lateral force must be restricted so that the grabbing members do not jam the tube in the hole and lock it in the tube sheet 18 through excessive expansion. This sideways jamming of the tube can prevent withdrawal of the tube from the tube sheet. The grabbing members are adjusted to satisfy this requirement by their axial rotation about the longitudinal axis of apparatus in the manner hereinbefore described.

It should be noted that while the expansion tap 82, FIG. 6 is being retracted and is moving longitudinally with respect to the expansion finger 84, the expansion tap 82 is also moving laterally with respect to the expansion finger 84. During this step in the tube withdrawal sequence, the expansion finger 84 is essentially stationary with respect to the sidewall of the tube 16. This lateral motion of the expansion tap 82 and any misalignment between the sidewall of the tube and the gripping members are compensated by the lateral motion permitted between the floating yoke 42 and the chamber housing 34. As hereinbefore described the yoke 42 has a smaller diameter than the interior cavity of the chamber housing. This smaller diameter permits the expansion tap 82 to move laterally to engage the interior sidewall of the tube 16 and to conform to the curvature of the sidewall.

Referring to FIG. 7, the tube 16 is withdrawn from the tube sheet 18 by the operating shaft 36 simultaneously retracting the two grabbing members 14, the friction carrier 70 and the chamber housing 34. The tube 16 is pulled into the nose anvil 118 until the operating shaft is fully retracted into the hydraulic cylinder.

When the operating shaft reaches its most retracted position, the hydraulic actuator 22, FIG. 2 is positioned to direct hydraulic fluid into line 25 and thereby pressurize the piston side of the hydraulic cylinder. The hydraulic fluid causes the operating shaft to start extending and pushing the chamber housing 34, the yoke 42, and the adapter 44 toward the nose anvil 118. Since the expansion tap 82 is threaded into the adapter 44, it likewise moves toward the nose anvil. In contrast, the friction carrier 70 is initially stationary because the 0-rings 78 frictionally engage the inner sidewall of the main housing 112 and the adapter 44 is not as yet in contact with the friction carrier. Since the friction carrier is not initially moved by the hydraulic operating shaft, the expansion finger 84 is likewise not initially moved. This relative motion between the expansion tap and the expansion finger causes their combined cross sectional area to decrease and the teeth 92, 92' release the tube 16. Thereafter, when the stop flange 64 on the adapter 44 contacts the inner cap screw 104, the friction carrier 70 is likewise pushed in the direction of the extending operating shaft. The motion of the hydraulic operating shaft continues until the shaft is again fully extended. This position is the starting position illustrated in FIG. 5.

When the teeth 92, 92' of the grabbing members 14 release the inner sidewall of the tube 16, the tube pulling apparatus is removed from the tube. The tube pulling apparatus is thereafter positioned in a subsequent tube and the above described process repeated. Since the tube 16 has been released from its anchorage in the tube sheet 18, the tube is thereafter manually withdrawn without difficulty.

In the embodiment of the present invention actually constructed the tube pulling apparatus extracted heat exchanger tubes at an average rate of approximately five tubes per minute. It has been observed that the present invention operates most effectively with tubes having an outside diameter in the range of one-half to one inch and a thickness of between sixteen to twenty gauge. However, the present invention is fully operable on tubes up to and including four inches in diameter.

It should be appreciated from the above description that the two complementary grabbing members 14 are constructed to engage the entire circumference of the cylindrical interior sidewall of a tube. This circumferential engagement of the tube is of special importance with small diameter tubes where the surface area of the inner sidewall is small.

It should also be noted that the friction carrier 70 performs three functions during the tube pulling operation. The friction carrier permits relative longitudinal motion between the expansion tap 82 and the expansion finger 84. This longitudinal relative motion permits the grabbing and releasing of the inner sidewall of the tube. Secondly, the friction carrier extracts the tube from the tube sheet by simultaneously pulling both grabbing members. Thirdly, the friction carrier permits the adapter 44 to push the expansion tap and the expansion finger to their fully extended position.

Referring to FIG. 3, it can be seen that the inclined planar portion 90 of the expansion tap 82 can be defined by a cylindrical outer wall formed on the surface of an imaginary cylinder. This cylinder has an axis of symmetry which coincides with the longitudinal axis 124 of the expansion tap. Also, the inclined plane of the portion 90 can be defined as an inclined wall formed along a plane where the plane includes a diameter 126 of the imaginary cylinder and a line 128 orthogonal to this diameter where the line forms an acute angle with the longitudinal axis 124. This inclined wall extends substantially from the diameter 126 of the imaginary cylinder to the outer wall of the cylinder at a location 130 so that the cross sectional area of the end of the inclined planar portion 90 is greater than a semi-circular section of the imaginary cylinder.

Referring to FIG. 3 it can also be seen that the inclined planar portion 98 of the expansion finger 84 can also be defined by a cylindrical outer wall formed on the surface of an imaginary cylinder. The axis of symmetry of this cylinder is the longitudinal axis 132 of the expansion finger 84. The inclined plane of the expansion finger is defined by an inclined wall formed along a plane which includes a diameter 134 of the imaginary cylinder and a line 136 orthogonal to this diameter where the line forms an acute angle with the longitudinal axis 132 of the expansion finger. The inclined plane extends substantially from the diameter of the imaginary cylinder to the outer wall of the imaginary cylinder at a location 138 where the cross-sectional area of the end of the inclined planar portion 98 is less than the area of a semi-circular section of the imaginary cylinder.

Although the best mode contemplated for carrying out the present invention has been herein shown and described, it will be apparent that modification and variation may be made without departing from what is regarded to be the subject matter of the invention.

I claim:

1. Method of pulling tubes from a tube sheet, comprising the steps of:
   a. inserting two tube grabbing members into the tube being pulled, said tube grabbing members having a plurality of teeth disposed for engagement with the interior side wall of said tube;
   b. rotating relatively one tube grabbing member about the lonitudinal axis of the apparatus to cause relative longitudinal motion between both said members and to cause variation in the lateral dimension between the members so that adjustment to the size of the tube being pulled can be effected;
   c. translating the tube grabbing members relatively and longitudinally by withdrawing slightly one tube grabbing member from the tube while maintaining the other grabbing member stationary, said tube grabbing members being mated to form a wedge so that said relative translational motion provides lateral dimensional variation that causes the tube grabbing members to engage the interior side wall of the tube;
   d. compensating for misalignment between the tube grabbing members and the side wall of the tube during the step of relative translation;
   e. translating both tube grabbing members together and thereby extracting the tube from the tube sheet; and
   f. releasing the tube grabbing members from engagement with the interior side wall of the tube by relatively translating in a longitudinal direction one of said tube grabbing members with respect to the other.

2. Apparatus for pulling tubes from a tube sheet, comprising:
   a. an elongate first tube grabbing member having a plurality of teeth disposed on the side wall thereof to engage the interior side wall of the tube being pulled;
   b. an elongate second tube grabbing member dimensioned to complement the first tube grabbing member and having a plurality of teeth disposed on the side wall thereof to engage the interior side wall of the tube being pulled, said first and second tube grabbing members having common inclined planar surfaces that provide lateral dimensional variation by relative longitudinal motion between the members;
   c. an hydraulic cylinder connectable to a source of pressurized hydraulic fluid, said cylinder having an extendable and retractable operating shaft that is operatively connected to the first and second tube grabbing members;
   d. housing means connected to the hydraulic cylinder for enclosing the apparatus and for engaging the surface of the tube sheet, said housing means supporting the hydraulic cylinder with respect to the tube sheet so that the operating shaft and the tube grabbing members can move in a longitudinal direction relative to the tube sheet and thereby withdraw the tube;
   e. lost motion means within the housing means operatively connected between the operating shaft and the first and second tube grabbing members, said lost motion means permitting the tube grabbing members to move in a longitudinal direction relative to each other while being translated by the operating shaft and to engage thereby the side wall of the tube being pulled; and
   f. coupling means within the housing means operatively connected between the operating shaft and the first and second tube grabbing members, said coupling means having chamber housing means connected to the free end of the operator shaft and slidable with respect to and inside of the housing means; adapter means operatively connected to the tube grabbing members; a pin connected to the chamber housing means and positioned laterally with respect to the longitudinal axis of the apparatus; and pin engaging means connected to the adapter means and operatively engaging the lateral pin so that the operating shaft, the chamber housing means and the adapter means are longitudinally translatable by the hydraulic cylinder, said pin engaging means preventing axial rotation of the adapter means with respect to the longitudinal axis of the apparatus so that one tube grabbing member can be relatively rotated with respect to the apparatus to cause the relative longitudinal motion between both said members which causes the variation in lateral dimension between the members.

3. The apparatus of claim 2 wherein the first tube grabbing member includes an elongate, substantially cylindrical end portion for engagement by the tube pulling machine; a medial flat planar portion intersecting the longitudinal axis of the apparatus and having a semi-circular cross-section; and an inclined planar end portion which forms a wedge the free end of which has a larger lateral dimension measured normal to said plane than the lateral dimension measured proximate to the flat planar portion, said inclined planar end portion having a plurality of teeth disposed on the cylindrical side wall thereof and wherein the second tube grabbing member includes an elongate, substantially semi-circular second tube grabbing member having a shoulder at one end for engagement by the tube pulling machine; a medial flat planar portion intersecting the longitudinal axis of the apparatus and having a semicircular cross-section; and an inclined planar end portion which forms a wedge the free end of which has a smaller lateral dimension measured normal to said plane than the lateral dimension measured proximate to the flat planar portion, said inclined planar end portion having a plurality of teeth disposed on the cylindrical side wall thereof, the planar end portions of the first and second tube grabbing members each having an angle of inclination such that when the two members are mated together, relative longitudinal motion between both said members causes a variation in lateral dimension between said members, and, both said planar end portions have teeth disposed thereon that engage substantially the entire circumference of the inner side wall of a tube.

4. Apparatus in a tube pulling machine for engaging and withdrawing the tubes in a tube sheet, comprising:
a. an elongate, substantially cylindrical, first tube grabbing member having an end portion for engagement by the tube pulling machine, a medial flat planar portion intersecting the longitudinal axis of the apparatus and having a semi-circular cross-section, and an inclined planar end portion which forms a wedge the free end of which has a larger lateral dimension measured normal to said plane than the lateral dimension measured proximate to the flat planar portion, said inclined planar end portion having a plurality of teeth disposed on the cylindrical side wall thereof; and
b. an elongate, substantially semi-circular second tube grabbing member having shoulder means at one end for engagement by the tube pulling machine, a medial flat planar portion intersecting the longitudinal axis of the apparatus and having a semi-circular cross-section, and an inclined planar end portion which forms a wedge the free end of which has a smaller lateral dimension measured proximate to the flat planar portion, said inclined planar end portion having a plurality of teeth disposed on the cylindrical side wall thereof, said first and second tube grabbing members having complementary dimensions such that when the two members are mated by joining their flat planar portions together the combined cross-section of the members at the flat planar portion is circular and when the two members are mated by joining their inclined planar portions together the combined cross-section of the members at the planar portion is also substantially circular, the planar end portions of the first and second tube grabbing members each having an angle of inclination such that when the two members are mated together, relative longitudinal motion between both said members causes a variation in lateral dimension between said members, and, both said planar end portions have teeth disposed thereon that engage substantially the entire circumference of the inner side wall of a tube.

5. The apparatus of claim 4 wherein the inclined planar end portion of the first and second tube grabbing members each has an angle of inclination of substantially five degrees measured with respect to the longitudinal axis of the apparatus.

6. The apparatus of claim 4 wherein the teeth disposed on the cylindrical side wall of each inclined planar end portion extend completely around the circular surface thereof such that when the first and second tube grabbing members are mated together by joining their inclined planar surfaces the teeth are contiguous around the circular cross-section thereof.

7. Apparatus for use in a tube pulling machine, to pull a tube, comprising:
a first member having a first end for translational engagement with the tube pulling machine and having a second end for engagement with the tube to be pulled, said second end of said first member defined by a first cylindrical outer wall formed on the surface of an imaginary cylinder having a first longitudinal axis extending between said first and second ends of said first member and defined by a first inclined wall formed along a first plane where the first plane includes a first diameter of the first cylinder and includes a line orthogonal to said first diameter where said line forms an acute angle with said first longitudinal axis, where the first incline wall extends substantially from said first diameter to the cylindrical outer wall at a location where the cross-sectional area, measured at the intersection of a plane orthogonal to said first longitudinal axis and said second end of said first member, is greater than a semi-circular section of said first cylinder; and
a second member having a first end for translational engagement with the tube pulling machine and having a second end for engagement with the tube to be pulled, said second end of said second member defined by a second cylindrical outer wall formed on the surface of a second imaginary cylinder having a second longitudinal axis extending between said first and said second ends of said second member, said second end of said second member defined by a second inclined wall formed along a second plane where said second plane includes a second diameter of the second cylinder and includes a line orthogonal to said second diameter where said line forms an acute angle with said second longitudinal axis, where the second inclined wall extends substantially from said second diameter to the cylinder outer wall at a location where the cross-sectional area, measured at the intersection of a plane orthogonal to said second longitudinal axis and said second end of said second member, is less than the area of semi-circular section of said second cylinder;

said first and second members being adapted for mating along said first and second inclined walls and adapted for translation parallel to said first and second longitudinal axis to thereby change the combined cross-sectional area of said members, said first and second members having teeth disposed thereon that engage substantially the entire circumference of the inner side wall of the tube being pulled.

8. The apparatus of claim 7 wherein said acute angle is substantially five degrees.

9. Apparatus for pulling tubes from a tube sheet, comprising:
   a. an elongate first tube grabbing member having a plurality of teeth disposed on the side wall thereof to engage the interior side wall of the tube being pulled;
   b. an elongate second tube grabbing member dimensioned to complement the first tube grabbing member and having a plurality of teeth disposed on the side wall thereof to engage the interior side wall of the tube being pulled, said first and second tube grabbing members having common inclined planar surfaces that provide lateral dimensional variation by relative longitudinal motion between the members;
   c. an hydraulic cylinder connectable to a source of pressurized hydraulic fluid, said cylinder having an extendable and retractable operating shaft that is operatively connected to the first and second tube grabbing members;
   d. housing means connected to the hydraulic cylinder for enclosing the apparatus and for engaging the surface of the tube sheet, said housing means supporting the hydraulic cylinder with respect to the tube sheet so that the operating and the tube grabbing members can move in a longitudinal direction relative to the tube sheet and thereby withdraw the tube;
   e. lost motion means within the housing means operatively connected between the operating shaft and the first and second tube grabbing members, said lost motion means permitting the tube grabbing members to move in a longitudinal direction relative to each other while being translated by the operating shaft and to engage thereby the side wall of the tube being pulled; and
   f. displaceable coupling means within the housing means operatively connected between the operating shaft and the first and second tube grabbing members, said coupling means being laterally displaceable with respect to the longitudinal axis of the apparatus so that misalignment between the tube grabbing members and the side wall of the tube is compensated, said displaceable coupling means further includes chamber housing means rigidly connected to the free end of the operating shaft and slidable with respect to and inside of the housing means, said chamber housing means having an interior cylindrical opening of predetermined diameter; adapter means threadably connected to one of the tube grabbing members; a housing pin rigidly attached to the chamber housing means and located within the cylindrical opening thereof, said pin being positioned laterally with respect to the longitudinal axis of the apparatus; and cylindrical yoke means received within the cylindrical opening of the chamber housing means, said yoke means being connected to the adapter means and retained within the chamber housing means so that the operating shaft, the chamber housing means and the adapter means are longitudinally translatable by the hydraulic cylinder, said yoke means having a channel cut across one surface thereof for receiving the housing pin, the housing pin being rigidly connected to the chamber housing means and the operating shaft, said yoke means preventing axial rotation of the adapter means with respect to the longitudinal axis of the apparatus so that the one tube grabbing member which is threadably connected to the adapter means can be relatively rotated with respect to the apparatus to cause the relative longitudinal motion between both said members which causes the variation in lateral dimension between the members.

* * * * *

UNITED STATES PATENT AND TRADEMARK OFFICE
CERTIFICATE OF CORRECTION

PATENT NO. : 4,000,556
DATED : January 4, 1977
INVENTOR(S) : Anthony S. Ciminero It is certified that error appears in the above-identified patent and that said Letters Patent are hereby corrected as shown below:

In the claims, column 9, line 67, delete "lonitudinal" and substitute -- longitudinal --; and column 13, line 48, after the word "operating" insert -- shaft --.

Signed and Sealed this

Fifth Day of April 1977

[SEAL]

Attest:

RUTH C. MASON
Attesting Officer

C. MARSHALL DANN
Commissioner of Patents and Trademarks